Oct. 18, 1966          TAKASHI FUNAKI           3,279,166
              TIMEPIECE OF THE NUMERAL INDICATING TYPE
Filed March 24, 1965
                                              4 Sheets-Sheet 1
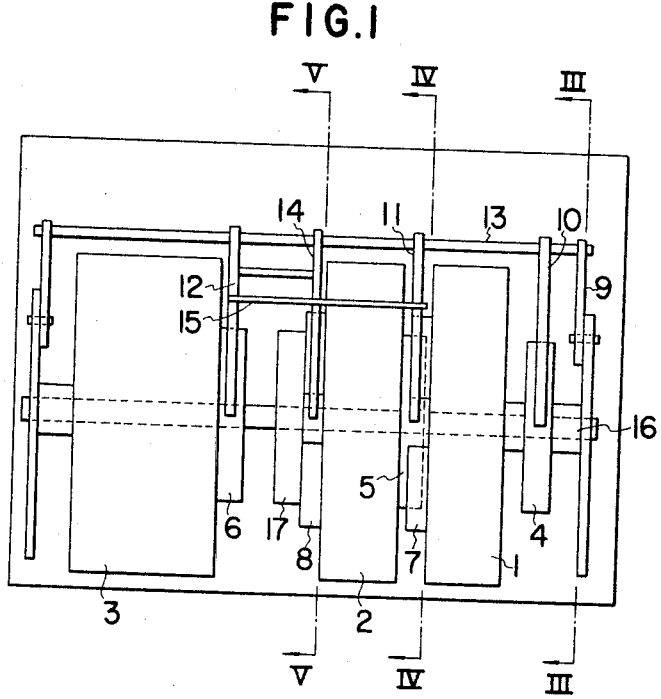
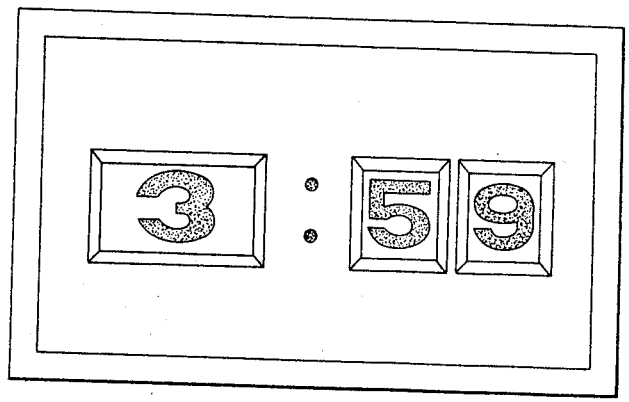
INVENTOR
TAKASHI FUNAKI Oct. 18, 1966    TAKASHI FUNAKI    3,279,166
TIMEPIECE OF THE NUMERAL INDICATING TYPE
Filed March 24, 1965

INVENTOR
TAKASHI FUNAKI

Oct. 18, 1966　　　　　TAKASHI FUNAKI　　　　　3,279,166
TIMEPIECE OF THE NUMERAL INDICATING TYPE
Filed March 24, 1965　　　　　　　　　　　　　　　4 Sheets-Sheet 3

INVENTOR
TAKASHI FUNAKI

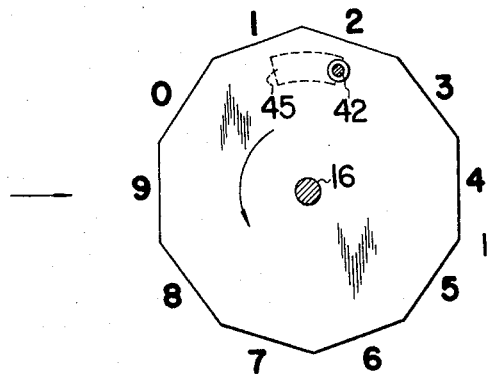
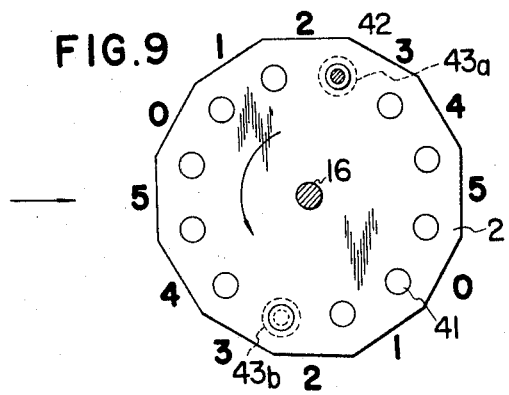
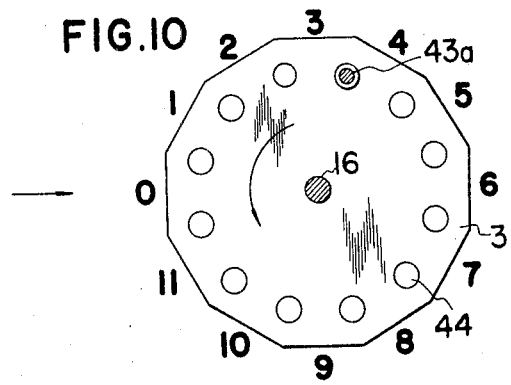

United States Patent Office 3,279,166
Patented Oct. 18, 1966

3,279,166
TIMEPIECE OF THE NUMERAL
INDICATING TYPE
Takashi Funaki, Nerima-ku, Tokyo-to, Japan, assignor to Kabushiki Kaisha Koseisha, Tokyo-to, Japan, a joint-stock company of Japan
Filed Mar. 24, 1965, Ser. No. 442,295
Claims priority, application Japan, Mar. 26, 1964, 39/22,738; May 9, 1964, 39/35,842
3 Claims. (Cl. 58—125)

This invention relates to timepieces of the numeral indicating type and more particularly to novel dial disks adapted to indicate the time by numerals carried thereby.

Timepieces of the type referred to above are not used widely, except those for special applications, because indication of time is not based on the decimal numeration so that mechanisms for the indicating numerals are complicated an expensive to manufacture.

Another disadvantage of timepieces of the numeral indicating type is that it is difficult to correct time indications. In one method for correction of time, dial disks are driven at an accelerated speed to bring them to positions to indicate correct time. However, this method of correction not only requires a long time but also causes undesirable wearing of the moving parts of the timepiece. In another method of correcting the indicated time, wherein dial disks are rotated by hand to positions to indicate correct time, it is necessary to provide a special mechanism between the driving gears for adjacent dial disks in order to interrupt the motion transmitting relation between them, thus rendering the driving mechanism complicated.

It is therefore an object of this invention to provide a novel timepiece wherein numerals representing hours and minutes can be indicated by a simple mechanism.

Another object of this invention is to provide a clock of the numeral indicating type wherein correction of the indicated time can be made readily.

A more specific object of this invention is to provide novel dial disks which can be driven intermittently by simple driving means.

A further object of this invention is to provide a novel driving mechanism to intermittently drive, in a predetermined sequence, a plurality of dial disks of a timepiece to indicate hours and minutes.

Briefly stated, according to this invention there is provided a timepiece comprising a casing including windows through which numerals indicating the time can be seen a shaft disposed in said casing, first, second, and third dial disks which are mounted rotatably in side by side relation on said shaft, and means to intermittently drive said dial disks in a predetermined sequence. The first dial disk is used to indicate or display minutes and is provided on its peripheral surface with numerals 0 to 9, inclusive. The second dial disk is used to indicate integer multiples of 10 minutes and is provided on its peripheral surface with a repetition of a group of numerals consisting of 0 to 5, inclusive, and the third dial disk is used to indicate hours and is provided on its peripheral surface with numerals 0 to 11 inclusive, with the numeral 0 indicating either 12:00 noon or 12:00 midnight.

In one form of this invention, the driving mechanism for said dial disks includes a pawl and ratchet combination for each disk and, in a modification, includes pins and a cam. In either case, as the angle of rotation of the respective dial disks per one step of advance is 30° and 36°, respectively, it is possible to intermittently drive the respective dial disks in a predetermined sequence by the use of relatively simple driving mechanism. This mechanism also permits easy and rapid correction of the indicated time without using any special mechanism for time correction.

This invention can be more fully understood from the following detailed description. Reference being had to the accompanying drawings in which:

FIG. 1 is a plan view of one embodiment of this invention;

FIG. 2 is a front view of the timepiece shown in FIG. 1;

FIG. 8 shows a cross-section of the timepiece taken along a line VIII—VIII of FIG. 7;

FIG. 9 shows a cross-section of the timepiece taken along a line IX—IX of FIG. 7; and FIG. 10 shows a cross-section of the timepiece taken along a line X—X of FIG. 7.

Throughout the drawings, like or corresponding parts are designated by the same reference numerals.

Figure 3:
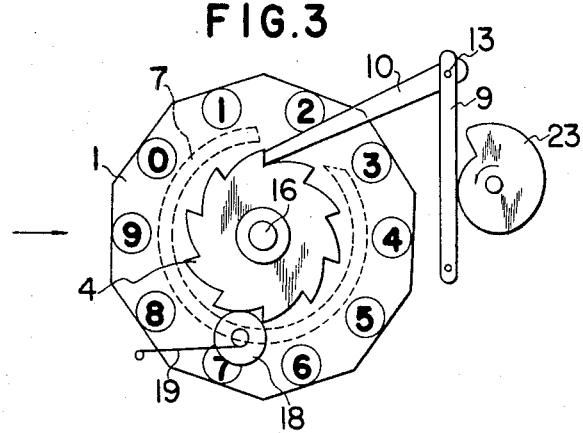
FIG. 3 shows a cross-section of the timepiece taken along a line III—III of FIG. 1.
Figure 4:
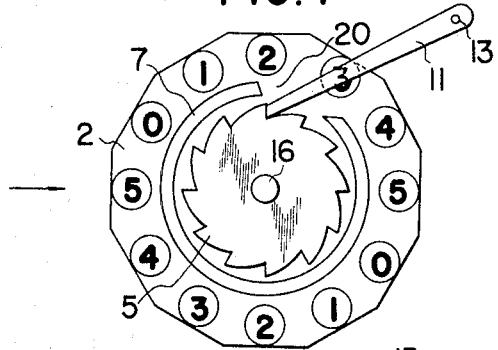
FIG. 4 shows a cross-section of the timepiece taken along a line IV—IV of FIG. 1.
Figure 5:
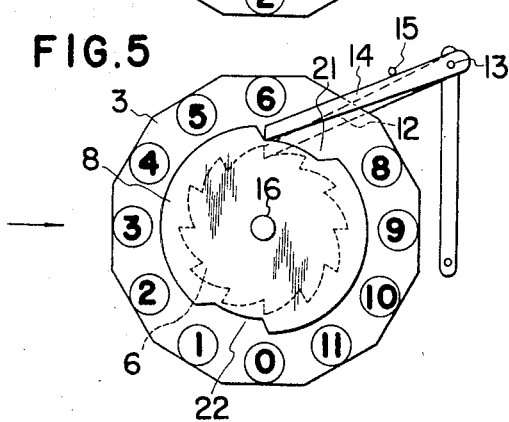
FIG. 5 shows a cross-section of the timepiece taken along a line V—V of FIG. 1.

Referring now to the accompanying drawings, the timepiece of this invention includes three dial plates or disks 1, 2 and 3 to indicate the time by numerals marked on the peripheries of the disks. The dial disk 1 is marked with ten numerals of from 0 to 9, inclusive, on the peripheral surface thereof, the dial disk 2 is marked with two groups of numerals each consisting of 0 to 5 inclusive, these groups of numerals being arranged in the order of 0, 1, 2, 3, 4, 5, 0, 1, 2, 3, 4, 5 as shown in FIG. 4, whereas the dial disk 3 is marked with twelve numerals of 0 to 11, inclusive. It is to be understood that numerals on the disk 1 indicate minutes, those on the disk 2 integer multiples of 10 minutes and those on the disk 3 hours. To simplify the drawing while these numerals are shown on the side surfaces of the disks, in the actual construction they are to be marked or suitably secured on the peripheral surfaces of circular or polygonal dial disks at the relative angular positions as shown in FIGS. 3, 4 and 5. These dial disks are mounted on a common horizontal shaft 16 to be rotatable independently.

In the embodiment shown in FIGS. 1 through 6 each of the dial disks is driven by a ratchet wheel secured thereto and a cooperating pawl. More particularly a ratchet wheel 4 having 10 teeth and an annular ring 7 with one portion cut away are suitably secured to the first dial disk 1. Similarly, the second and third dial disks 2 and 3 are provided with a ratchet wheel 5 having 12 teeth and a circular disk 8 with a pair of depressions 21 and 22, and with a ratchet wheel 6 having 12 teeth, respectively. As shown in FIGS. 3 and 4 a portion of the annular ring 7 is cut away at 20 corresponding to one tooth of the ratchet wheel 5, and as shown in FIG. 5 the circular disk 8 is provided with a pair of diametrically opposite depressions 20 and 21 of the peripheral length corresponding to one tooth of the ratchet wheel 6. The dial disk 1, the ratchet wheel 4 and the annular ring 7 may be prepared separately and then fabricated into a unitary structure or may be formed as an integral unit. The second and third dial disks and their associated parts can be fabricated in the same manner. Pawls 10, 11, 12 and 14 respectively adapted to drive ratchet wheels 4, 5, 6 and the circular disk 8 are mounted on a common horizontal shaft 13 to be actuated with an interlocked relationship. The shaft 13 is driven by a rotary cam 23 through a lever 9, and cam 23 is rotated at a speed of one revolution per minute by a suitable driving means such as a synchronous motor, not shown. The pawls 12 and 14 are interconnected by a pin 15 so as to move in unison, and the extension of the pin 15 is in engagement with the pawl 11 so that the pin 15 is moved around the shaft 13 by the pivotal movement of the pawl 11.

As shown in FIG. 3, the pawl 10 is normally held to engage the teeth of the ratchet wheel 4, but the pawl 11 is so arranged that it can engage the teeth of the ratchet wheel 5 as shown in FIG. 4, only when the first dial disk 1 is in a position to represent the numeral 9 as shown in FIG. 3. Accordingly the pawl 11 is in engagement with the outside periphery of the annular ring 7 when the first dial disks 1 assumes positions which represents numerals other than 9. The pawl 12 is so arranged that it can engage the ratchet wheel 6 only when the first dial disk 1 is in the position to represent the numeral 9 and when the second dial disk 2 is in the position to represent the numeral 5. More particularly, the pawl 12 is permitted to engage and drive the ratchet wheel 6 only when the pawl 10 is in engagement with the ratchet wheel 4, the pawl 11 is in engagement with the ratchet wheel 5 through the cut away portion 20 of the annular ring 7, and the pawl 14 is in engagement with the depression 21 or 22 of the circular disk 8 affixed to the second dial disk. FIGS. 3, 4 and 5 represent a state wherein the first, second and third dial disks 1, 2 and 3 are in positions to represent numerals 9, 5 and 3 respectively (these positions being shown by arrows in FIGS. 3, 4, and 5) or the time of 3 o'clock and 59 minutes, as shown in FIG. 2, it being understood that suitable windows are provided in the front panel of the timepiece to show these numerals. As has been pointed out hereinabove, when the first dial disk 1 assumes positions 0 to 8, inclusive, the pawl 11 is arranged to slide on the outer periphery of the annular ring 7 so as not to engage the ratchet wheel 5. Also when the second dial disk 2 is in positions repersenting 0 to 4, inclusive, the pawl 14 slides along the high portions of the circular disk 8 other than its depressions 21 and 22, thus preventing the pawl 12 from engaging the ratchet wheel 6. However, even when the pawl 14 is in engagement with either the depression 21 or 22 of the circular disk 8 to permit the pawl 12 to engage the ratchet wheel 6, unless the pawl 11 is permitted to extend through the cut away portion 20 of the annular ring 7, the pawl 11 will engage the pin 15 to elevate it and hence to elevate the pawls 12 and 15 out of engagement from ratchet wheels 12 and 6, respectively.

To prevent reverse rotation of ratchet wheels 4, 5 and 6, and a roller 18 is biassed against each of the ratchet wheels by means of a leaf spring 19, as illustrated in FIG. 3. This also assures positive step-by-step rotation of the ratchet wheels.

While in the embodiment shown in FIGS. 1 to 5, inclusive, the second ratchet wheel 5 is shown to be enclosed by the annular ring 7 and to be driven by a single pawl 11 through the cut away portion 20 of the ring 7, and the third ratchet wheel 6 and the circular disk 8 are shown in a spaced relation to cooperate with independent pawls 12 and 14, it will be apparent that the second ratchet wheel 5 and the annular ring 7 may be spaced axially and that the third ratchet wheel 6 and the circular disk 8 may be driven by a common pawl. The configurations of the annular ring 7 and of the annular disk 8 may be suitably varied, the only requirement to be satisfied being that these ratchet wheels be driven in a predetermined relationship as above described by the interlocked motion of said pawls. It should also be understood that instead of actuating the lever 9 by a continuously rotating driving means such as a synchronous motor or a spring motor, it may be actuated by pulses at a rate of one pulse per minute.

According to this invention, since the second dial disk adapted to indicate numerals corresponding to integer multiples of 10 is provided with a repetition of a group of numerals consisting of 0 to 5 inclusive, the angles of rotation per one actuation of the first, second and third dial disks 1, 2 and 3 will be 36°, 30° and 30° respectively. In other words, as the differences among these angles of rotation are relatively small, different dial disks can be actuated by a common driving means by mere adjustment of the length and position of the respective pawls, thus eliminating complicated gear trains and thus simplifying the construction of the timepiece of the numeral indicating type.

Figure 6:
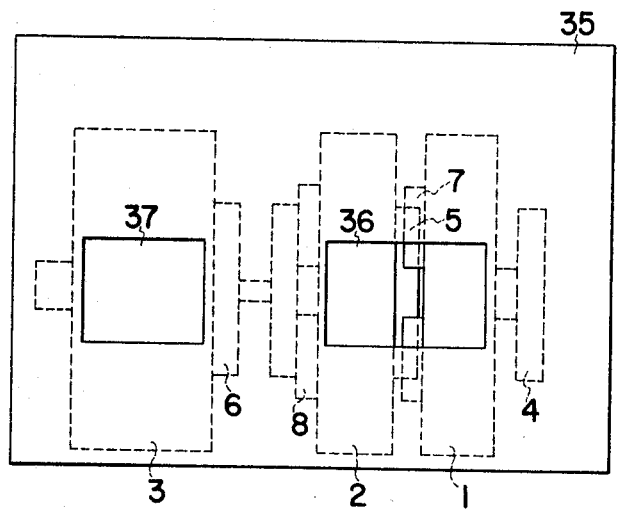
FIG. 6 is a bottom plan view of the timepiece shown in FIG. 1.

In a timepiece of this type utilizing a driving gear train it is necessary to provide a mechanism to disengage meshed gears in order to correct the time indicated by the timepiece, but in the timepiece of this invention, the respective dial disks can be rotated in either direction by a finger to correct the time without providing a special mechanism for correction. This correction can be conveniently done by providing a suitable opening or openings 36 and 37 through the bottom plate 35 or a rear plate of the casing of the timepiece, as shown in FIG. 6 to permit access to the dial disks 1, 2 and 3. If required this opening or openings may be normally closed by a removable lid to prevent infiltration of dust.

If desired, a fourth disk representing the days of the week may be provided, in which case characters representing the days of the week are marked in duplicate around the periphery of the fourth disk, namely Sunday, Sunday, Monday, Monday, and so on, and it is advantageous to construct the driving mechanism in a manner such that the fourth disk is advanced by one step every 12 hours or one revolution of the third dial disk 3.

Figure 7:
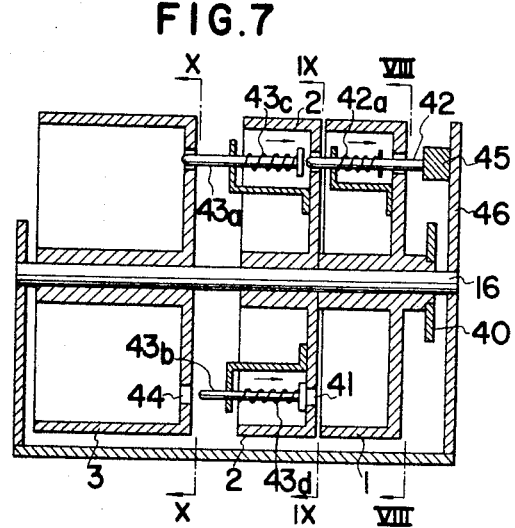
FIG. 7 is a longitudinal sectional view of a modified embodiment of this invention.

Referring now to a modification of this invention shown in FIGS. 7 through 10, the first, second and third dial disks 1, 2 and 3 are identical to those of the first embodiment and are rotatably mounted on a common horizontal shaft 16. The first dial disk 1 is arranged to be driven intermittently at a rate of 36° per minute through a suitable driving means 40 such as a gear train or a pawl and a ratchet wheel. The first dial disk 1 is provided with an axially displaceable pin 42 for driving the second disk 2. Similarly the second dial disk 2 has two axially displaceable pins $43_a$ and $43_b$ for driving the third dial disk 3, as shown in FIG. 7. As shown in FIG. 9, the second dial disk 2 is also provided with 12 equally spaced perforations 41 arranged on a circle to successively receive the pin 42, and the pins $43_a$ and $43_b$ are symmetrically disposed with regard to the shaft 16 to face corresponding performations 41. Similarly, the third dial disk 3 is formed with 12 circumferentially spaced perforations 44 to receive the pins $43_a$ or $43_b$. Said pins 42, $42_a$ and $43_b$ are normally biased in the direction indicated by arrows by means of springs $42_a$, $43_c$ and $43_d$ respectively. When the respective dial disks are rotated to the positions shown in FIGS. 8, 9 and 10, respectively, the pin 42 will be biased toward the left by a cam 45 secured on the inner surface of a side plate 46 to engage one of the perforations 41 of the second dial disk 2. Concurrently therewith, the pins $43_a$ or $43_b$ will be urged toward the left by the pin 42 to engage one of the perforations 44 of the third dial disk 3.

It is to be understood that pins 42, $43_a$, and $43_b$, perforations 41 and 44, and the cam 45 should be so constructed as to satisfy the following relationships. That is, it is assumed that the first dial disk 1 is rotated intermittently at a rate of 36° per minute. As long as this disk is assuming positions to indicate the numerals other than 9, the pin 42 is out of engagement with the cam 45, so that the pin 42 is biased to the right by the spring $42_a$ to be disengaged from the perforation 41. However, when the dial disk 1 is brought to a position to display the numeral 9, the pin 42 rides on the cam 42 to engage one of the perforations 41 of the second dial disk 2. As a result, disks 1 and 2 are driven in unison when the former is driven the next time. Upon completion of said unitary movement, the cam 45 releases the pin 42 to permit it to retract from the perforation 41.

The pin 42 is brought into axial alignment with the pin $43_a$ or $43_b$, and the pin 42 is biased toward the left by cam 45 to cause the pin $43_a$ or $43_b$ to engage one of the perforation 44 of the third dial disk, only when the first dial disk 1 is in the position to display the numeral 9, and the second dial disk 2 is in a position to display its numeral 5. As a result the three dal disks 1, 2 and 3 are rotated in unison when the first dial disk 1 is driven the next time. Upon completion of this unitary movement, the cam 45 releases the pin 42 so that interlocking between the three dial disks is released. Thereafter, only the first dial disk 1 is driven intermittently during the next 9 minutes. In FIGS. 8, 9 and 10 the dial disks are shown in positions to display numerals 9, 5 and 0, respectively.

Again, the angles of rotation of the dial disks 1, 2 and 3 are 36°, 30° and 30°, respectively. Thus, as the difference between these angles is small, it is possible to positively drive these disks by proper selection of the configuration and position of the cam 45 without using complicated gear trains or pawl and ratchet combinations. Moreover, relative angular positions of the dial disks can be readily adjusted by hand.

While the invention has been described with reference to preferred embodiments thereof it will be understood that this invention is by no means limited to these illustrated embodiments and many modifications may be made therein without departing from the true spirit and scope of the invention as defined in the appended claims.

What I claim is:

1. A timepiece of the numeral indicating type comprising, in combination, a casing formed with windows; a shaft disposed in said casing; first, second and third dial disks mounted in axially adjacent relation on said shaft and freely rotatable thereon, each disk being exposed through a respective window; said first dial disk being provided on its peripheral surface with numerals 0 to 9, inclusive, adapted to indicate minutes; said second dial disk being provided on its peripheral surface with a repetition of a group of numerals consisting of 0 to 5 inclusive, adapted to indicate integer multiples of 10 minutes; said third dial disk being provided on its peripheral surface with numerals 0 to 11, inclusive, adapted to indicate hours, with the numeral 0 indicating either 12:00 noon or 12:00 midnight; a first ratchet wheel secured concentrically to said first dial disk; a first annular ring secured concentrically to the surface of said first dial disk facing said second dial disk, said first annular ring having a cutout therein; a second ratchet wheel secured concentrically to said second dial disk and disposed within said first annular ring; a circular disk secured concentrically to the surface of said second dial disk facing said third dial disk, said circular disk having diametrically opposite depressions in its periphery; a third ratchet wheel secured to said third dial disk; first, second and third pawls operatively associated with said first, second and third ratchet wheels, respectively; said pawls being swingably mounted on a common shaft; means operable to oscillate said common shaft once each minute; said first annular ring obstructing engagement of said second pawl with said second ratchet wheel except when said first dial disk exposes the numeral 9 through its associated window; thereby said second dial disk is advanced only at the end of each 10 minutes; and means, including said circular disk and the diametrically opposite depressions on the periphery thereof, obstructing engagement of said third pawl with said third ratchet wheel except when said second dial disk is exposing a numeral 5 through its associated window and said first dial disk is exposing its numeral 9 through its associated window; whereby said third dial disk is advanced only once each hour.

2. A timepiece of the numeral indicating type comprising, in combination, a casing formed with windows; a shaft disposed in said casing; first, second and third dial disks mounted in axially adjacent relation on said shaft and freely rotatable thereon, each disk being exposed through a respective window; said first dial disk being provided on its peripheral surface with numerals 0 to 9, inclusive, adapted to indicate minutes; said second dial disk boing provided on its peripheral surface with a repetition of a group of numerals consisting of 0 to 5 inclusive, adapted to indicate integer multiples of 10 minutes; said third dial disk being provided on its peripheral surface with numerals 0 to 11, inclusive, adapted to indicate hours, with the numeral 0 indicating 12:00 noon and 12:00 midnight; a first ratchet wheel secured concentrically to said first dial disk; a first annular ring secured concentrically to the surface of said first dial disk facing said second dial disk, said first annular ring having a cutout therein; a second ratchet wheel secured concentrically to said second dial disk and disposed within said first annular ring; a circular disk secured concentrically to the surface of said second dial disk facing said third dial disk, said circular disk having diametrically opposite depressions in its periphery; a third ratchet wheel secured to said third dial disk; first, second and third pawls operatively associated with said first, second and third ratchet wheels, respectively; said pawls being swingably mounted on a common shaft; means operable to oscillate said common shaft once each minute; said first annular ring obstructing engagement of said second pawl with said second ratchet wheel except when said first dial disk exposes the numeral 9 through its associated window; whereby said second dial disk is advanced only at the end of each 10 minutes; means, including said circular disk and the diametrically opposite depressions on the periphery thereof, obstructing engagement of said third pawl with said third ratchet wheel except when said second dial disk is exposing a numeral 5 through its associated window and said first dial disk is exposing its numeral 9 through its associated window; whereby said third dial disk is advanced only once each hour; said means obstructing engagement of said third pawl with said third ratchet wheel comprising a fourth pawl swingably mounted on said common shaft and engaged with said circular disk; and means interconnecting said third and fourth pawls and providing for said third pawl to engage said third ratchet wheel only when said fourth pawl is engaged with one of said diametrically opposite depressions on the periphery of said circular disk.

3. A timepiece of the numeral indicating type comprising a casing formed with windows; a shaft disposed in said casing; first, second and third dial disks mounted in axially adjacent relation on said shaft and freely rotatable thereon, each dial disk being exposed through a respective window; said first dial disk being provided on its peripheral surface with numerals 0 to 9, inclusive, adapted to indicate minutes; said second dial disk being provided on its peripheral surface with a repetition of a group of numerals consisting of 0 to 5, inclusive, adapted to indicate integer multiples of 10 minutes; said third dial disk being provided on its peripheral surface with numerals 0 to 11, inclusive, adapted to indicate hours; each of said second and third dial disks being formed with axial extending apertures therethrough equal in number to the peripheral numerals thereon and spaced uniformly angularly of the associated disk; a first axially displaceable pin mounted through said first dial disk and arranged to be extended through an aperture in said second dial disks; means biasing said first pin to a retracted position; cam means operatively engageable with said first axially displaceable pin to project the same through an aperture in said second dial disk each time said numeral 9 on said first dial disk is exposed through the associated window, whereby said second dial disk is advanced by one step each time said first dial disk advances from the indication 9 to the indication 0; a pair of second axially displaceable pins mounted through said second dial disk each aligned with a respective aperture therethrough, said second axially displaceable pins being at diametrically opposit locations; said second axially displaceable pins being arranged to be projected to engage through an aperture in said third dial disk; resilient means biasing each of said second axially displaceable pins to the retracted position; said first axially displaceable pin, when projected by said cam means, engaging one of said second axially displaceable pins to project the latter through an aperture in said third dial disk each time a numeral 5 on said second dial disk is exposed through its associated window; whereby said third dial disk is advanced by one step each time the indication of said second dial disk changes from 5 to 0 while the indication of said first dial disk changes from 9 to 0.

References Cited by the Examiner

UNITED STATES PATENTS

| | | | |
|---|---|---|---|
| 1,936,126 | 11/1926 | Daly | 58—2 |
| 3,177,645 | 4/1965 | Devanney | 58—2 |

FOREIGN PATENTS 30,397　3/1932　Australia.

RICHARD B. WILKINSON, *Primary Examiner.*

G. F. BAKER, *Assistant Examiner.*